United States Patent
Sakakibara

(10) Patent No.: US 8,964,424 B2
(45) Date of Patent: Feb. 24, 2015

(54) POWER CONVERTER, CONTROL METHOD THEREOF, AND DIRECT MATRIX CONVERTER

(75) Inventor: Kenichi Sakakibara, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 485 days.

(21) Appl. No.: 13/120,099

(22) PCT Filed: Sep. 16, 2009

(86) PCT No.: PCT/JP2009/066190
§ 371 (c)(1),
(2), (4) Date: Mar. 21, 2011

(87) PCT Pub. No.: WO2010/032761
PCT Pub. Date: Mar. 25, 2010

(65) Prior Publication Data
US 2011/0176340 A1      Jul. 21, 2011

(30) Foreign Application Priority Data
Sep. 22, 2008   (JP) .................... 2008-242482

(51) Int. Cl.
*H02M 5/45* (2006.01)
*H02M 1/12* (2006.01)
*H02M 5/297* (2006.01)

(52) U.S. Cl.
CPC .................. *H02M 5/297* (2013.01)
USPC ................ 363/37; 363/40; 363/41

(58) Field of Classification Search
USPC .......... 362/34, 37, 40, 41; 363/34, 37, 40, 41
See application file for complete search history.

(56) References Cited

U.S. PATENT DOCUMENTS 4,833,588 A * 5/1989 Schauder ............ 363/159
5,905,643 A * 5/1999 Gopfrich et al. ........ 363/41
(Continued)

FOREIGN PATENT DOCUMENTS

JP       6-81514 B2    10/1994
JP    2004-222338 A     8/2004
(Continued)

OTHER PUBLICATIONS

Kolar et al, "Novel Three-Phase AC-DC Sparse Matrix Converter," Part I: Derivation, Basic Principle of Operation, Space Vector Modulation, Dimensioning, IEEE, 2002, pp. 777-787.
(Continued)

*Primary Examiner* — Emily P Pham
(74) *Attorney, Agent, or Firm* — Birch, Stewart, Kolasch & Birch, LLP

(57) ABSTRACT

A voltage control rate of an inverter has a DC component and an AC component. This AC component has a frequency which is six times a fundamental frequency of an AC voltage outputted by the inverter. Even when there are not only a fifth-order harmonic component but also a seventh-order harmonic component of a load current, a ratio between the magnitude of the AC component and the DC component can be appropriately set.

20 Claims, 8 Drawing Sheets

(56) References Cited

U.S. PATENT DOCUMENTS

| | | | |
|---|---|---|---|
| 6,295,216 B1 * | 9/2001 | Faria et al. | 363/44 |
| 6,839,249 B2 | 1/2005 | Kalman et al. | |
| 6,879,062 B2 * | 4/2005 | Oates | 307/140 |
| 7,518,891 B2 * | 4/2009 | Wei et al. | 363/41 |
| 7,599,196 B2 * | 10/2009 | Alexander | 363/13 |
| 7,907,427 B2 | 3/2011 | Sakakibara et al. | |
| 2006/0197491 A1 * | 9/2006 | Nojima | 318/801 |
| 2009/0175059 A1 | 7/2009 | Sakakibara | |

FOREIGN PATENT DOCUMENTS

| | | |
|---|---|---|
| JP | 2005-27422 A | 1/2005 |
| JP | 2007-110827 A | 4/2007 |
| JP | 2007-312589 A | 11/2007 |
| JP | 4067021 B2 | 3/2008 |

OTHER PUBLICATIONS

Liu et al, "Multi-level voltage sourced conversion by voltage reinjection at six times the fundamental frequency," IEE Proc.-Electri. Power Appl., vol. 149, No. 3, May 2002, pp. 201-207.

"Trend of Direct AC/AC Converters and Related Technologies", Feb. 25, 2005, Technical Report No. 998 of the Institute of Electrical Engineers of Japan, pp. 24-25.

Itoh et al., "Decoupling Control of Input and Output Reactive Power of the Matrix Converter", Nov. 8, 2001, IEEJ Technical Meeting on Semiconductor Power Converter, SPC-01-121, IEA-01-64.

Wei et al., "A Novel Matrix Converter Topology With Simple Commutation", IEEE IAS 2001, 2001, vol. 3, pp. 1749-1754.

* cited by examiner

F I G. 7
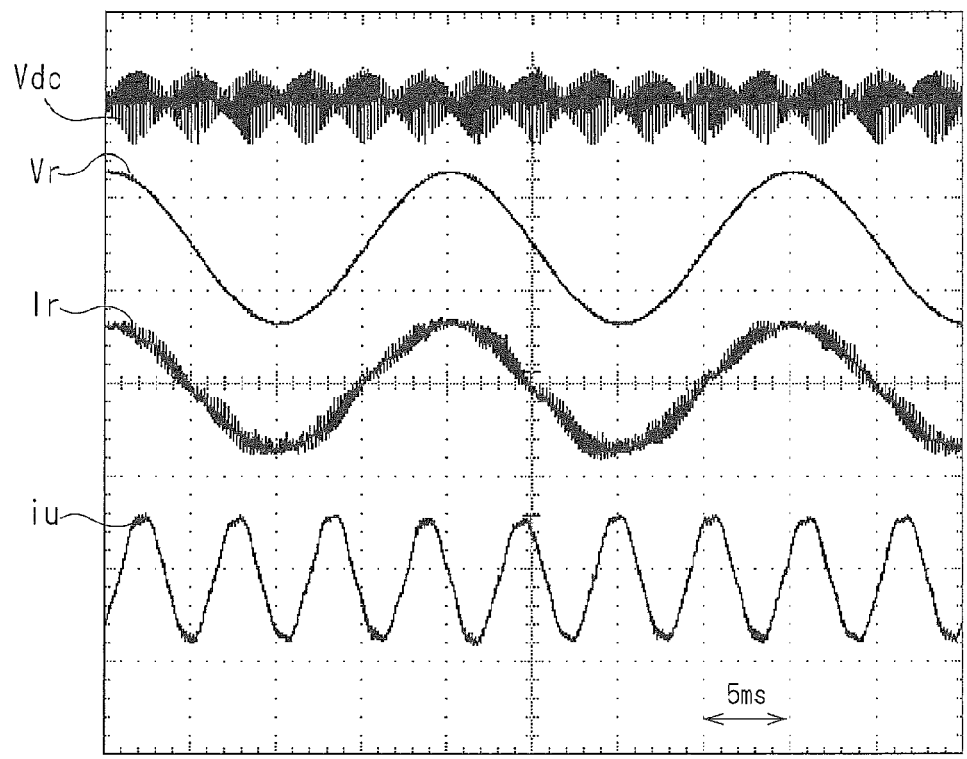
F I G. 8
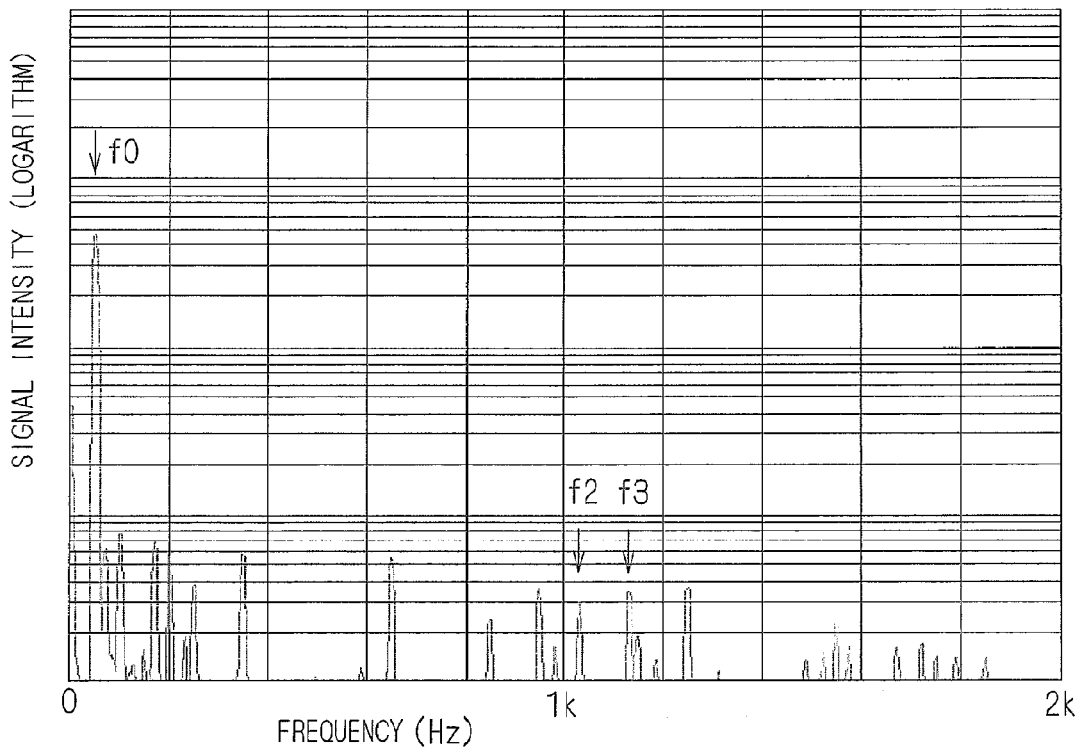

POWER CONVERTER, CONTROL METHOD THEREOF, AND DIRECT MATRIX CONVERTER

TECHNICAL FIELD

The present invention relates to a technique of reducing harmonics of a load current in a so-called AC power converter.

BACKGROUND ART

As a configuration of an AC-AC power converter, an indirect-type AC power converter is generally used. In an indirect-type AC power converter, a commercial AC is converted into a DC by a rectifier circuit and, additionally through a smoothing circuit, power is supplied to a voltage-source converter, so that an AC output is obtained from the voltage-source converter.

On the other hand, a direct-type AC power converter, such as a matrix converter, which performs an AC-AC conversion without using a smoothing circuit is also known. The matrix converter performs the AC-AC conversion by using a commutation in a group of switching elements.

However, as introduced in Japanese Patent Application Laid-Open No. 2004-222338 and Rie Itoh and Isao Takahashi, "Decoupling Control of Input and Output Reactive Power of the Matrix Converter", IEEJ Technical Meeting on Semiconductor Power Converter, SPC-01-121, IEA-01-64, the matrix converter can, even though actually having no DC link, control a commutation in the group of switching elements based on an operation of a configuration in which a virtual AC-DC converter and a virtual DC-AC converter are coupled with each other through a virtual DC link having no smoothing circuit. This matrix converter is called a direct matrix converter.

As introduced in Lixiang Wei, Thomas. A Lipo, "A Novel Matrix Converter Topology With Simple Commutation", IEEE IAS 2001, vol. 3, 2001, pp 1749-1754, a configuration in which an AC-DC converter and a DC-AC converter are coupled with each other through a DC link having no smoothing circuit has also been proposed as an embodiment of the matrix converter. This matrix converter is called an indirect matrix converter.

Furthermore, Japanese Patent No. 4067021 introduces an inverter in which even though a capacitor is provided in a DC link, the capacitance of the capacitor is selected and set to be so small as not to function as a smoothing circuit. This technique presupposes that a voltage of the DC link ripples.

Therefore, in the present application, irrespective of whether or not a DC link is formally provided or whether or not a capacitor is formally provided, a circuit performing an AC power conversion without interposition of a real smoothing circuit is referred to as a direct-type AC power converter.

In the direct-type AC power converter, a capacitor and a reactor which have a large size and smooth a voltage ripple caused by a commercial frequency are not required, and therefore downsizing of the converter can be expected. Thus, in recent years, the direct-type AC power converter is attracting attention as a next-generation power converter.

The need to process ripple energy in the direct-type AC power converter is mentioned in "Trend of Direct AC/AC Converters and Related Technologies", Technical Report No. 998 of the Institute of Electrical Engineers of Japan, pp 24-25.

SUMMARY OF THE INVENTION

Problems to be Solved by the Invention

Here, in a case where a motor is adopted as a load of the direct-type AC power converter, concentrated winding is often employed as a winding method in an armature winding of the motor. This is because a reduction in a copper loss is required in order to improve the efficiency and reduce the amount of copper.

However, Japanese Patent Application Laid-Open No. 2005-27422 points out the fact that a current (armature current) flowing in an armature winding which employs the concentrated winding contains harmonic components, particularly a fifth-order component and a seventh-order component, caused by a difference between a voltage outputted by an inverter and a voltage of an induced electromotive force of a rotary electric machine.

FIG. 9 is a graph showing the percentage of content of harmonics in an input-side current in a case where the frequency of an output voltage of a power converter is changed from 90 Hz to 330 Hz on a 30 Hz basis when a motor including an armature winding which employs the concentrated winding is driven in an inverter. It is shown that occurrence of harmonics is significantly observed in the fifth-order and the seventh-order irrespective of the frequency.

There is a problem that when a load causing such harmonic components is driven in the direct-type power converter, a harmonic current occur at the power-source side. This is because, in a direct-type power converter, even when it is a type having a DC link, a ripple occurs in active power since there is no energy storage element.

"Trend of Direct AC/AC Converters and Related Technologies", Technical Report No. 998 of the Institute of Electrical Engineers of Japan, pp 24-25 mentions, regarding a direct-type power converter, a relationship between active power and reactive power of the power-source side and the load side and a variation in instantaneous active power in a case where the harmonic current occurs, and thus explains the need for an energy storage element in a DC link. However, no specific method of handling the direct-type power converter (having a DC link but not having a smoothing capacitor) is suggested.

Japanese Patent Application Laid-Open No. 2007-110827 proposes a technique of superimposing a compensation signal on a voltage command value in an apparatus which performs an AC-AC conversion on a single-phase AC power source. However, no specific method is shown regarding a conversion of a multi-phase AC. Moreover, simple application of the technique disclosed in Japanese Patent Application Laid-Open No. 2007-110827 to the multi-phase AC is not effective, as will be described later.

Therefore, an object of the present application is to reduce ripple of active power caused by odd-number-order harmonic components in a current which flows in an inductive load exemplified by a motor when an AC voltage is outputted to the load. This leads to suppression of ripple of active power of a DC link in a direct-type power converter having the DC link but not having a smoothing capacitor, and therefore power-source harmonics can be suppressed.

Means for Solving the Problems

A power converter control method according to the present invention is a method for controlling a direct-type AC power converter (9) which has a first AC voltage (Vr, Vs, Vt) inputted thereto and outputs a second AC voltage (Vu, Vv, Vw) based on the first AC voltage.

According to a first aspect thereof, the direct-type power converter includes a rectifier circuit (3) having the first AC voltage inputted thereto and outputting a rectified voltage (Vdc), and a voltage-source inverter having the rectified voltage inputted thereto and outputting the second AC voltage (Vu, Vv, Vw). A voltage control rate (Ks) of the voltage-source inverter has a DC component (Ks1) and an AC component (Ks6·cos(6ω$_L$t)) whose frequency (6φ/2πt) is six times a fundamental frequency (φ/2πt) of the second AC voltage.

According to a second aspect thereof, in the first aspect, a ratio (Ks6/Ks1) of the absolute value (Ks6) of the AC component of the voltage control rate with respect to the DC component (Ks1) of the voltage control rate is equal to a ratio of the absolute value (I$_{L5}$) of a fifth-order harmonic component of a current flowing in the output side of the voltage-source inverter (4) with respect to the absolute value (I$_L$) of a fundamental wave component of the current.

According to a third aspect thereof, in the first aspect, a ratio (Ks6/Ks1) of the absolute value (Ks6) of the AC component of the voltage control rate with respect to the DC component (Ks1) of the voltage control rate is equal to a ratio of the sum of the absolute value (I$_{L5}$) of a fifth-order harmonic component and the absolute value (I$_{L7}$) of a seventh-order harmonic component of a current flowing in the output side of the voltage-source inverter (4) with respect to the absolute value (I$_L$) of a fundamental wave component of the current.

According to a fourth aspect thereof, in the first to third aspects, the second AC voltage (Vu, Vv, Vw) has three phases, and the voltage control rate (Ks) is updated in each 60-degree section of a phase (φ) of the second AC voltage.

According to a fifth aspect thereof, in the first to fourth aspects, the voltage-source inverter (4) is controlled by a pulse-width modulation based on a result of comparison between a carrier (C) and a signal wave (Vu*, Vv*, Vw*), and the signal wave is determined in accordance with a space vector modulation based on the voltage control rate (Ks) and a command value (v*, φ*, f*) of each of the amplitude, the phase, and the frequency of the second AC voltage.

According to a sixth aspect thereof, the direct-type power converter is a direct matrix converter (MCV), and in a virtual AC/DC/AC control thereof, a virtual rectifier circuit (3) for virtually rectifying the first AC voltage to obtain a virtual rectified voltage and a virtual voltage-source inverter (4) for obtaining the second AC voltage from the virtual rectified voltage are assumed. A voltage control rate (Ks) of the virtual voltage-source inverter has a DC component (Ks1) and an AC component (Ks6·cos(6ω$_L$t)) whose frequency (6φ/2πt) is six times a fundamental frequency (φ/2πt) of the second AC voltage.

According to a seventh aspect thereof, in the sixth aspect, a ratio (Ks6/Ks1) of the absolute value (Ks6) of the AC component of the voltage control rate with respect to the DC component (Ks1) of the voltage control rate is equal to a ratio of the absolute value (I$_{L5}$) of a fifth-order harmonic component of a current flowing in the output side of the virtual voltage-source inverter (4) with respect to the absolute value (I$_L$) of a fundamental wave component of the current.

According to an eighth aspect thereof, in the sixth aspect, a ratio (Ks6/Ks1) of the absolute value (Ks6) of the AC component of the voltage control rate with respect to the DC component (Ks1) of the voltage control rate is equal to a ratio of the sum of the absolute value (I$_{L5}$) of a fifth-order harmonic component and the absolute value (I$_{L7}$) of a seventh-order harmonic component of a current flowing in the output side of the virtual voltage-source inverter (4) with respect to the absolute value (I$_L$) of a fundamental wave component of the current.

According to a ninth aspect thereof, in the sixth to eighth aspects, the second AC voltage (Vu, Vv, Vw) has three phases, and the voltage control rate (Ks) is updated in each 60-degree section of a phase (φ) of the second AC voltage.

According to a tenth aspect thereof, in the sixth to ninth aspects, the virtual voltage-source inverter (4) is controlled by a pulse-width modulation based on a result of comparison between a carrier (C) and a signal wave (Vu*, Vv*, Vw*), and the signal wave is determined in accordance with a space vector modulation based on the voltage control rate (Ks) and a command value (v*, φ*, f*) of each of the amplitude, the phase, and the frequency of the second AC voltage.

A first aspect of the power converter (9) according to the present invention is a direct-type AC power converter controlled by the power converter control method according to any one of the first to fifth aspects, and including the rectifier circuit (3) and the voltage-source inverter (4).

A second aspect of the power converter (9) according to the present invention is a direct matrix converter (MCV) controlled by the power converter control method according to any one of the sixth to tenth aspects.

These and other objects, features, aspects and advantages of the present invention will become more apparent from the following detailed description of the present invention when taken in conjunction with the accompanying drawings Effects of the Invention In the first aspect of the power converter control method according to the present invention, a ripple in active power caused by odd-number-order harmonic components of a current which flows in an inductive load when the second AC voltage is applied to the load is reduced.

In the second aspect of the power converter control method according to the present invention, a ripple in active power caused by the fifth-order harmonic component of the current flowing in the load is effectively reduced.

In a third aspect of the power converter control method according to the present invention, a ripple in active power caused by the fifth-order harmonic component and the seventh-order harmonic component of the current flowing in the load is effectively reduced.

In the fourth aspect of the power converter control method according to the present invention, the maximum value of the fundamental wave component of an outputtable voltage is increased without causing the amplitude of the voltage command to exceed the amplitude of the carrier.

In the fifth aspect of the power converter control method according to the present invention, the effect of the control method according to the first to fourth aspects is obtained in the space vector modulation.

In the power converter according to the present invention, the effects of the control method according to the first to fifth aspects are obtained.

BRIEF DESCRIPTION OF THE DRAWINGS

FIG. 7 is a graph showing voltages and currents;

FIG. 8 is a spectrum of a line current;

EMBODIMENT FOR CARRYING OUT THE INVENTION

A. Configuration of Direct-Type Power Converter.

Figure 1:
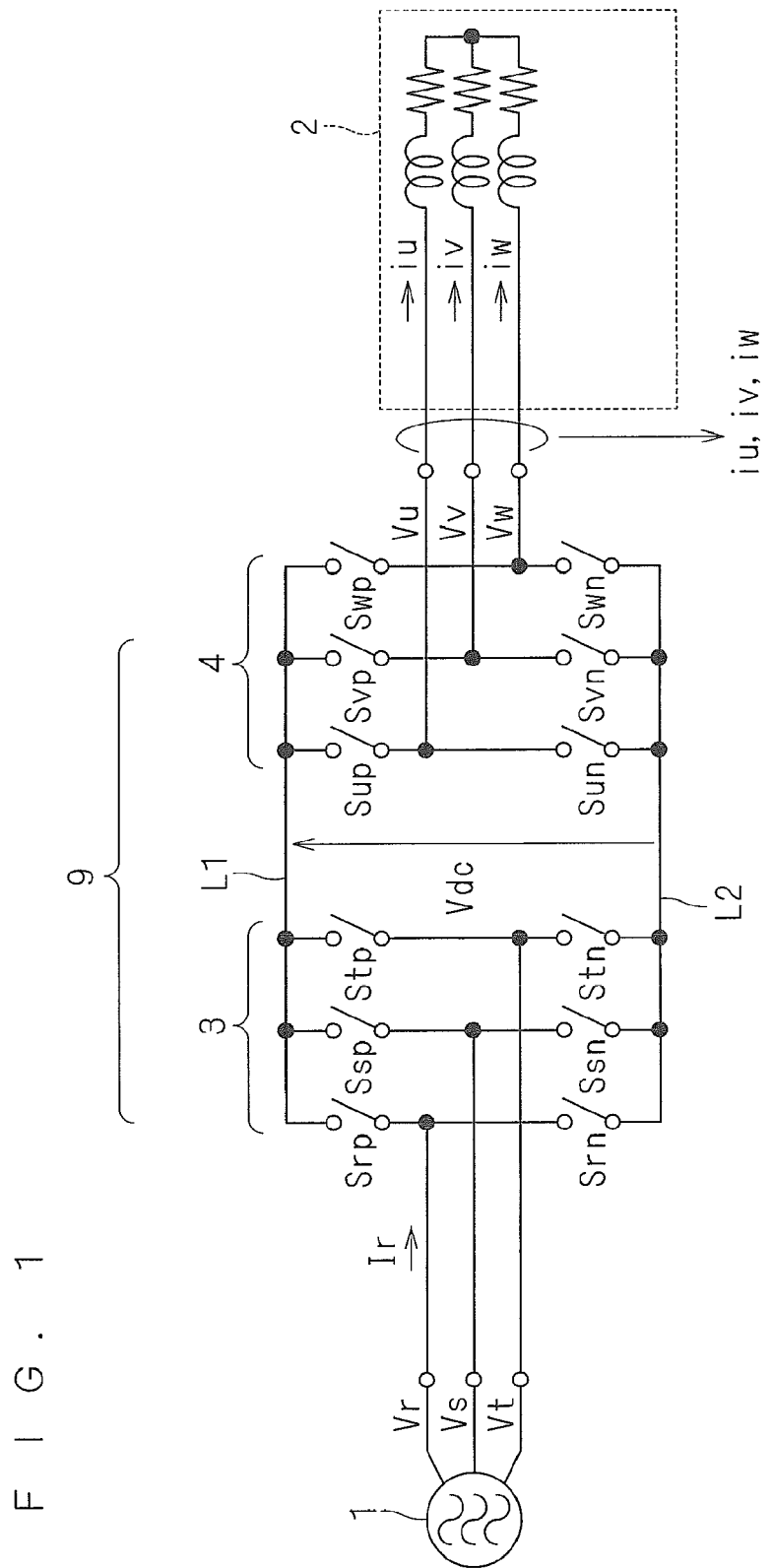
FIG. 1 is a circuit diagram showing a configuration of a direct-type power converter to which the present invention is applicable.

FIG. 1 is a circuit diagram showing a configuration of a direct-type power converter 9 to which the present invention is applicable. The direct-type power converter 9 includes a converter 3, an inverter 4, and a pair of DC power supply lines L1, L2 connecting them to each other.

The converter 3 functions as a rectifying circuit and rectifies three-phase (here, R-phase, S-phase, and T-phase) AC voltages Vr, Vs, Vt, and outputs a rectified voltage Vdc to the pair of DC power supply lines L1, L2.

The converter 3 is a current-source rectifier for example, and operated by a pulse-width modulation. The converter 3 has a plurality of current paths which are connected in parallel with one another between the DC power supply lines L1, L2. One of the current paths of the converter 3 corresponding to the R-phase includes a pair of switching elements Srp, Srn which are connected in series with each other between the DC power supply lines L1, L2. A voltage Vr is applied to a connection point between the switching elements Srp, Srn. One of the current paths of the converter 3 corresponding to the S-phase includes a pair of switching elements Ssp, Ssn which are connected in series with each other between the DC power supply lines L1, L2. A voltage Vs is applied to a connection point between the switching elements Ssp, Ssn. One of the current paths of the converter 3 corresponding to the T-phase includes a pair of switching elements Stp, Stn which are connected in series with each other between the DC power supply lines L1, L2. A voltage Vt is applied to a connection point between the switching elements Stp, Stn.

The switching elements Srp, Ssp, Stp and the switching elements Srn, Ssn, Stn are connected to the DC power supply line L1 side and the DC power supply line L2 side, respectively.

The inverter 4 is a voltage-source inverter for example, and operated by a pulse-width modulation according to an instantaneous space vector control (hereinafter simply referred to as a "vector control"). The inverter 4 outputs three-phase (here, U-phase, V-phase, and W-phase) AC voltages.

The inverter 4 has a plurality of current paths which are connected in parallel with one another between the DC power supply lines L1, L2. One of the current paths of the inverter 4 corresponding to the U-phase includes a pair of switching elements Sup1, Sun1 which are connected in series with each other between the DC power supply lines L1, L2. An output voltage Vu is obtained from a connection point between the switching elements Sup1, Sun1. One of the current paths of the inverter 4 corresponding to the V-phase includes a pair of switching elements Svp, Svn which are connected in series with each other between the DC power supply lines L1, L2. An output voltage Vv is obtained from a connection point between the switching elements Svp1, Svn1. One of the current paths of the inverter 4 corresponding to the W-phase includes a pair of switching elements Swp, Swn which are connected in series with each other between the DC power supply lines L1, L2. An output voltage Vw is obtained from a connection point between the switching elements Swp, Swn.

The switching elements Sup, Svp, Swp are connected to the DC power supply line L1 side. Hereinafter, these switching elements are recognized as high-arm side switching elements. The switching elements Sun, Svn, Swn are connected to the DC power supply line L2 side. Hereinafter, these switching elements are recognized as low-arm side switching elements. That is, the potential of the DC power supply line L1 is higher than the potential of the DC power supply line L2. Configuration of the aforementioned switching elements Srp, Ssp, Stp, Srn, Ssn, Stn, Sup, Svp, Swp, Sun, Svn, Swn themselves are known, and illustrated in Lixiang Wei, Thomas. A Lipo, "A Novel Matrix Converter Topology With Simple Commutation", IEEE IAS 2001, vol. 3, 2001, pp 1749-1754, for example.

The inverter 4 is operated under the vector control. Operations of the switching elements Sup, Svp, Swp, Sun, Svn, Swn are controlled based on gate signals Sup*, Svp*, Swp*, Sun*, Svn*, Swn* which are control signals. A description will be given based on an assumption that when these gate signals take the logical value "1"/"0", the corresponding switching elements are rendered conducting/non-conducting. Except a so-called dead time, the gate signals Sup*, Svp*, Swp* take values complementary to the gate signals Sun*, Svn*, Swn*. That is, using a subscript q to collectively represent the subscripts u, v, w, the exclusive logical sum of the signals Sqp*, Sqn* is "1".

The subscript x of a vector Vx (x=integer from 0 to 7) which is adoptable in such a vector control is given by 4·Sup*+2·Svp*+Swp*. For example, when all of the high-arm side switching elements Sup, Svp, Swp are non-conducting, all of the low-arm side switching elements Sun, Svn, Swn are conducting. In this case, x=0 is established, and the inverter 4 is in a vector V0 which is one state of a zero vector.

To the contrary, when all of the high-arm side switching elements Sup, Svp, Swp are conducting, all of the low-arm side switching elements Sun, Svn, Swn are non-conducting. In this case, x=7 is established, and the inverter 4 is in a vector V7 which is another state of the zero vector different from the vector V0.

A load 2 is an inductive load, and connected to the inverter 4. To be specific, the load 2 is a motor having three-phase coils which are Y-connected and to which the voltages Vu, Vv, Vw are applied. On the circuit diagram, a resistance component of each of the three-phase coils is shown as a resistor which is connected in series with this coil. Currents iu, iv, iw flow in the coils corresponding to the U-phase, V-phase, and the W-phase, respectively. These currents are monitored by a current sensor (not shown).

Figure 2:
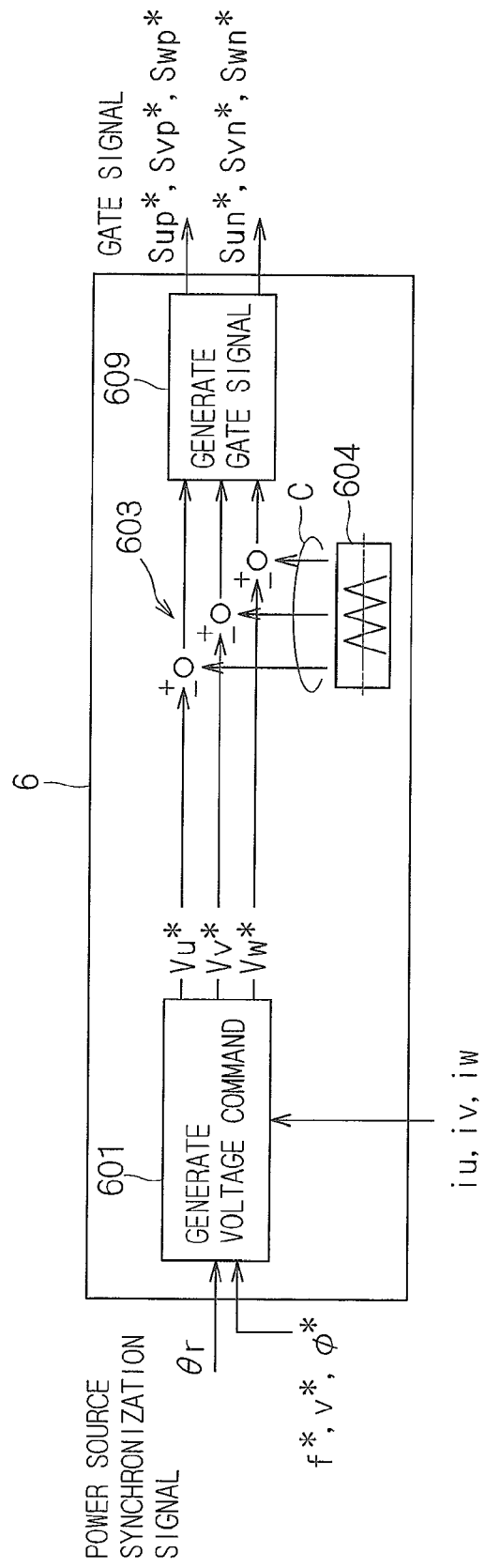
FIG. 2 is a block diagram showing a configuration of an inverter control section.

FIG. 2 is a block diagram showing a configuration of an inverter control section 6. The inverter control section 6 generates gate signals Sup*, Svp*, Swp*, Sun*, Svn*, Swn*.

The inverter control section 6 includes a voltage command generation section 601, a carrier generation section 604, a comparison section 603, and a gate signal generation section 609.

To the voltage command generation section 601, an angle θr (which functions as a power source synchronization signal) indicating the phase of the voltage Vr, a command value f* of an operation frequency of the inverter 4, a voltage command value v*, and a phase command value φ* are inputted, and based on them, voltage commands Vu*, Vv*, Vw* of the inverter 4 with reference to the phase of the voltage Vr is generated.

The comparison section 603 compares the voltage commands Vu*, Vv*, Vw* with a carrier C. Normally, a triangular wave is adopted as the carrier C. Based on a result of this comparison, the gate signal generation section 609 outputs the gate signals Sup*, Svp*, Swp*, Sun*, Svn*, Swn*.

Figure 3:
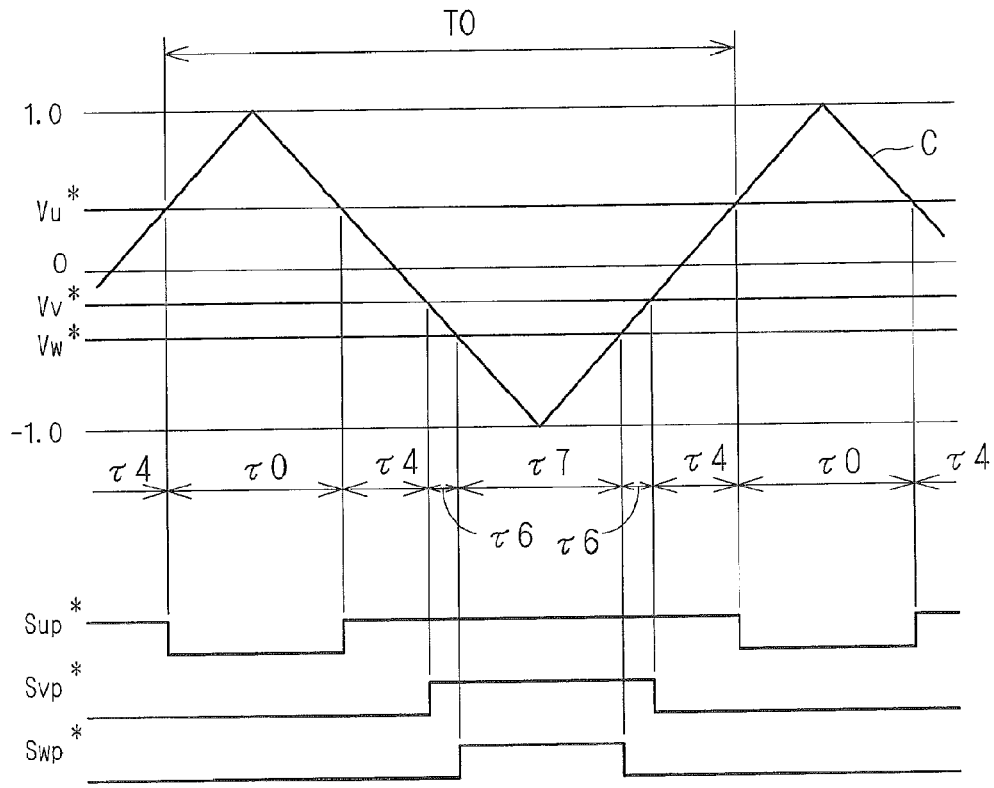
FIG. 3 is a graph showing the relationship between voltage commands and gate signals.

FIG. 3 is a graph showing the relationship between the voltage commands Vu*, Vv*, Vw* and the gate signals Sup*, Svp*, Swp*, Sun*, Svn*, Swn*. Here, a triangular wave having the minimum value −1 and the maximum value 1 is adopted as the carrier C. One cycle of the carrier C is T0, and time periods τ0, τ4, τ6, τ7 are time periods in which vectors V0, V4, V6, V7 are adopted as a switching aspect of the inverter 4, respectively. For example, when the vector V0 is adopted as the switching aspect of the inverter 4, any of the gate signals Sup*, Svp*, Swp* is deactivated. In other words, the time period T0 is a time period in which the carrier C is higher than any of the voltage commands Vu*, Vv*, Vw*.

More specifically, when the carrier C is equal to or lower than the voltage command Vu*, the gate signal Sup* is activated; when the carrier C is equal to or lower than the voltage command Vv*, the gate signal Svp* is activated; and when the carrier C is equal to or lower than the voltage command Vw*, the gate signal Swp* is activated. Since the voltage commands Vu*, Vv*, Vw* are compared with the carrier C, they are also referred to as signal waves.

Thus, the voltage commands Vu*, Vv*, Vw* are determined in accordance with a space vector modulation based on the respective command values v*, φ*, f*. However, the voltage commands Vu*, Vv*, Vw* are furthermore determined also based on a voltage control rate Ks which will be described later.

B. Reduction of Harmonics.

Figure 9:
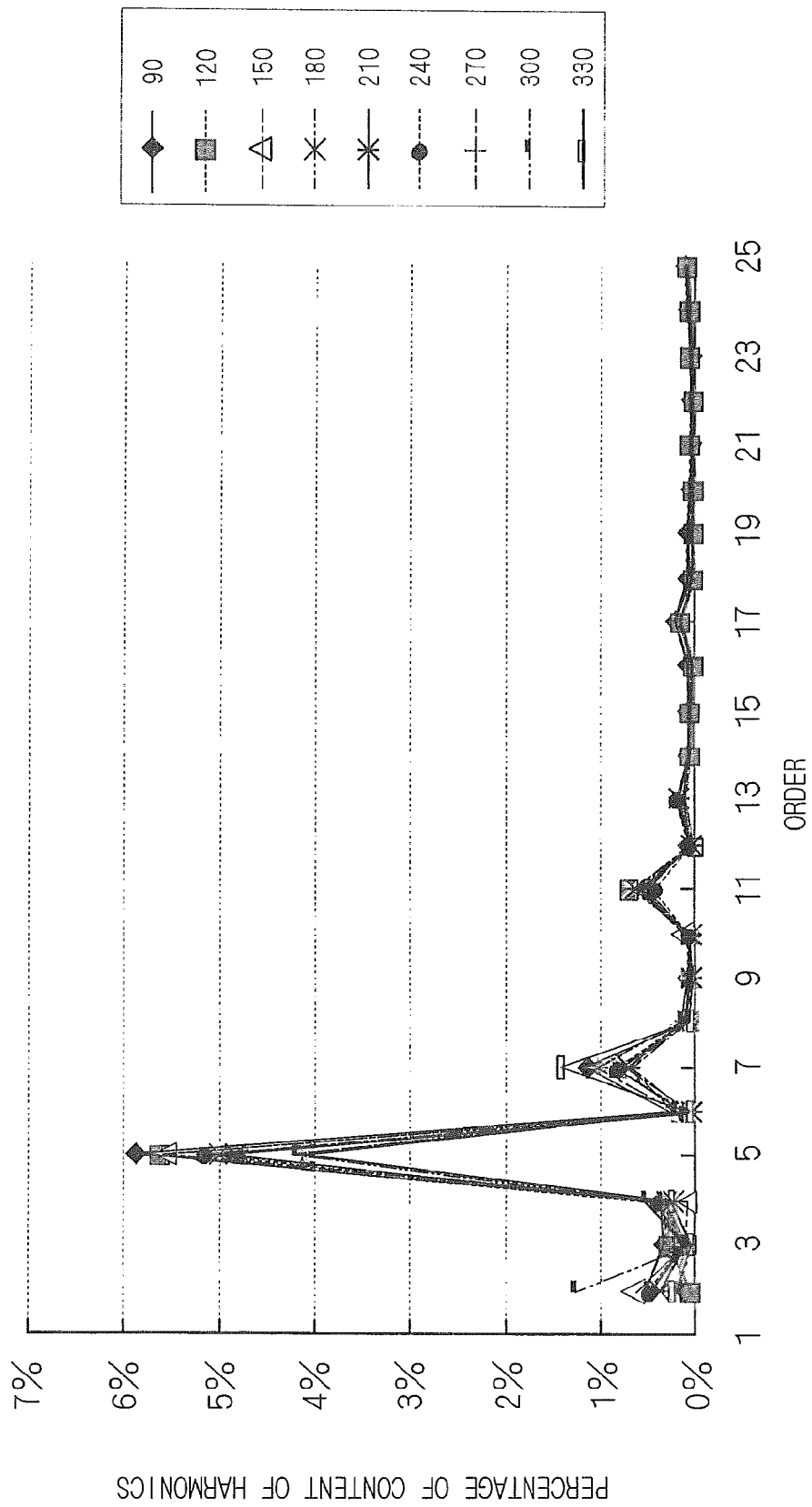
FIG. 9 is a graph showing the percentage of content of harmonics in an input-side current.

Firstly harmonics in the power consumption of the load 2 will be described. The voltages Vu, Vv, Vw and currents (hereinafter referred to as "load currents") iu, iv, iw which are applied to and flowing in the load 2 can be mathematized as the following expressions (1) and (2) without loss of generality. This is because the load 2 is an inductive load and power ripple occurring therein is caused by harmonics of the load currents iu, iv, iw. As shown in FIG. 9, a fifth-order harmonic is a main component of harmonic components, and therefore, only the fifth-order harmonic will be considered here.

$Vu = \sqrt{2} E_u \cos \omega_L t$ $Vv = \sqrt{2} E_v \cos(\omega_L t - 2\pi/3)$ $Vw = \sqrt{2} E_w \cos(\omega_L t + 2\pi/3)$ (1)

$iu = \sqrt{2} I_u \cos \omega_L t + \sqrt{2} I_{u5} \cos 5\omega_L t$ $iv = \sqrt{2} I_v \cos(\omega_L t - 2\pi/3) + \sqrt{2} I_{v5} \cos 5(\omega_L t - 2\pi/3)$ $iw = \sqrt{2} I_w \cos(\omega_L t + 2\pi/3) + \sqrt{2} I_{w5} \cos 5(\omega_L t + 2\pi/3)$ (2)

Here, introduced are an output frequency $\omega_L/2\pi t$ of the inverter 4, effective values $E_u$, $E_v$, $E_w$ of the respective voltages Vu, Vv, Vw, effective values $I_u$, $I_v$, $I_w$ of fundamental wave components of the respective currents iu, iv, iw, effective values $I_{u5}$, $I_{v5}$, $I_{w5}$ of fifth-order harmonic components of the respective currents iu, iv, iw, and a time t. Additionally, for simplification, it is assumed here that there is no delay in the current phase.

Accordingly, powers $P_u$, $P_v$, $P_w$ of the respective phases is represented by the expression (3).

$P_u = E_u I_u (1 + \cos 2\omega_L t) + E_u I_{u5} \cos 6\omega_L t + E_u I_{u5} \cos 4\omega_L t$ $P_v = E_v I_v (1 + \cos 2(\omega_L t - 2\pi/3)) + E_v I_{v5} \cos 6(\omega_L t - 2\pi/3) + E_v I_{v5} \cos 4(\omega_L t - 2\pi/3)$ $P_w = E_w I_w (1 + \cos 2(\omega_L t + 2\pi/3)) + E_w I_{w5} \cos 6(\omega_L t + 2\pi/3) + E_w I_{w5} \cos 4(\omega_L t + 2\pi/3)$ (3)

It can be considered that, in a steady state, the effective values $E_u$, $E_v$, $E_w$ take values equal to one another, and therefore the value is defined as $E_L$. In the same manner, it is assumed that any of the effective values $I_u$, $I_v$, $I_w$ takes the value $I_L$, and that any of the effective values $I_{u5}$, $I_{v5}$, $I_{w5}$ take the value $I_{L5}$. Thus, a power $P_L$ representing the sum of the powers $P_u$, $P_v$, $P_w$ is represented by the expression (4).

$P_L = 3E_L I_L + 3E_L I_{L5} \cos 6\omega_L t + E_L I_{L5} \cos 4\omega_L t + E_L I_{L5} \cos 4(\omega_L t - 2\pi/3) + E_L I_{L5} \cos 4(\omega_L t + 2\pi/3) = 3E_L I_L + 3E_L I_{L5} \cos 6\omega_L t$ (4)

In the expression (4), the first ter indicates the power resulting from the fundamental wave components of the currents iu, iv, iw, and the second term indicates the power resulting from the fifth-order harmonic components of the currents iu, iv, iw. As seen from the expression (4), the second term indicates a ripple component of the power consumption $P_L$ of the load 2. Therefore, the object of the invention of the present application can be attained by reducing the value $3E_L I_{L5} \cdot \cos 6\omega_L t$ in the second term.

According to the technique disclosed in Japanese Patent Application Laid-Open No. 2007-110827, a method of performing harmonic compensation of a load current by superimposing a compensation signal on a voltage command of an inverter is shown. The compensation signal has a frequency resulting from the product of the number of pole pairs in the electric motor and the number of rotations of the electric motor being multiplied by an integer. However, the relationship between this harmonic, and the fifth-order harmonic component and the seventh-order harmonic component pointed out in Japanese Patent Application Laid-Open No. 2005-27422 is not shown.

When it is assumed that the harmonic to be reduced in Japanese Patent Application Laid-Open No. 2007-110827 is identical to the fifth-order harmonic component and the seventh-order harmonic component pointed out in Japanese Patent Application Laid-Open No. 2005-27422, and furthermore it is assumed that the technique disclosed in Japanese Patent Application Laid-Open No. 2007-110827 is simply applied to a multi-phase AC, a correction of the fifth-order harmonic will be individually performed on each of the voltages Vu, Vv, Vw, and the value represented by the expression (5) will be set.

$Vu = \sqrt{2} E_u \cos \omega_L t - \sqrt{2} E_{u5} \cos 5\omega_L t$ $Vv = \sqrt{2} E_v \cos(\omega_L t - 2\pi/3) - \sqrt{2} E_{v5} \cos 5(\omega_L t - 2\pi/3)$ $Vw = \sqrt{2} E_w \cos(\omega_L t + 2\pi/3) - \sqrt{2} E_{w5} \cos 5(\omega_L t + 2\pi/3)$ (5)

Here, effective values $E_{u5}$, $E_{v5}$, $E_{w5}$ of correction values of the fifth-order harmonics of the respective voltages Vu, Vv, Vw are introduced.

The powers $P_u$, $P_v$, $P_w$ except the fundamental wave components, which are obtained based on the expressions (5) and (2), are represented by the expression (6).

$P_{u5} = -E_{u5} I_{u5} (1 + \cos 10\omega_L t) - E_{u5} I_u \cos 6\omega_L t - E_{u5} I_u \cos 4\omega_L t + E_u I_{u5} \cos 6\omega_L t + E_u I_{u5} \cos 4\omega_L t$ $P_{v5} = -E_{v5} I_{v5} (1 + \cos 10(\omega_L t - 2\pi/3)) - E_{v5} I_v \cos 6(\omega_L t - 2\pi/3) - E_{v5} I_v \cos 4(\omega_L t - 2\pi/3) + E_v I_{v5} \cos 6(\omega_L t - 2\pi/3) + E_v I_{v5} \cos 4(\omega_L t - 2\pi/3)$ $P_{w5} = -E_{w5} I_{w5} (1 + \cos 10(\omega_L t + 2\pi/3)) - E_{w5} I_w \cos 6(\omega_L t + 2\pi/3) - E_{w5} I_w \cos 4(\omega_L t + 2\pi/3) + E_w I_{w5} \cos 6(\omega_L t + 2\pi/3) + E_w I_{w5} \cos 4(\omega_L t + 2\pi/3)$ (6)

Therefore, when it is assumed that any of the effective values $E_u$, $E_v$, $E_w$ takes the value $E_L$, any of the effective values $I_u$, $I_v$, $I_w$ takes the value $I_L$, and any of the effective values $I_{u5}$, $I_{v5}$, $I_{w5}$ takes the value $I_{L5}$, the power $P_L$ representing the sum of the powers $P_u$, $P_v$, $P_w$ is represented by the expression (7).

$P_L = 3E_L I_L + P_{u5} + P_{v5} + P_{w5} = 3E_L I_L - 3E_{L5} I_{L5}$ (7)

Thereby, the ripple of the power $P_L$ does not occur. However, the correction has to be performed in consideration of a phase shift of each phase with respect to each of the voltages Vu, Vv, Vw, too. Moreover, in order to also reduce the seventh-order harmonic, the seventh-order harmonic has to be corrected, too. Such a correction of the voltages Vu, Vv, Vw is troublesome.

In this embodiment, therefore, a technique of reducing a power ripple without the need to consider a phase shift of each phase is provided. A process is also proposed in which a method thereof is almost the same not only in a case where a ripple correction is made with respect to the fifth-order harmonic but also in a case with respect to the seventh-order harmonic. This is firstly based on the following findings. The ripple term of the power $P_L$ in a case where only the seventh-order harmonic components of the load currents iu, iv, iw are considered is expressed similarly to that of the ripple term (the second term of the expression (4)) of the power $P_L$ in a case where only the fifth-order harmonic components of the load currents iu, iv, iw are considered.

When an effective value $I_{L7}$ of the seventh-order harmonic components of the load currents iu, iv, iw is introduced, the power $P_L$ in a case where only the seventh-order harmonic components of the currents iu, iv, iw are considered is represented by the expression (8).

$$P_L = 3E_L I_L + 3E_L I_{L7} \cos 6\omega_L t + E_L I_{L7} \cos 8\omega_L t + E_L I_{L7} \cos 8(\omega_L t - 2\pi/3) + E_L I_{L7} \cos 8(\omega_L t + 2\pi/3) = 3E_L I_L + 3E_L I_{L7} \cos 6\omega_L t \quad (8)$$

In the expression (8), as compared with the expression (4), the effective value $I_{L5}$ is replaced with the effective value $I_{L7}$. That is, it has been revealed that in either case where the harmonic component of the load current is the fifth-order one or the seventh-order one, the ripple term of the power $P_L$ varies as a sixth-order component of the output frequency of the inverter 4.

In view of these findings, the inventor has conceived a completely new technical idea that the voltages Vu, Vv, Vw are corrected with a sixth-order harmonic. A specific description will be given below.

A correction of the sixth-order harmonic is individually performed on each of the voltages Vu, Vv, Vw, and the value represented by the expression (9) is set.

$$Vu = \sqrt{2}[E_u - E_{u6} \cos 6\omega_L t] \cos \omega_L t$$
$$Vv = \sqrt{2}[E_v - E_{v6} \cos 6\omega_L t] \cos(\omega_L t - 2\pi/3)$$
$$Vw = \sqrt{2}[E_w - E_{w6} \cos 6\omega_L t] \cos(\omega_L t + 2\pi/3) \quad (9)$$

In the expression (5), a correction term of the opposite phase is simply added as the correction term. On the other hand, in the expression (9), the effective value of the fundamental frequency is corrected by a correction value having the sixth-order harmonic component. Taking the voltage Vu as an example, the effective value $E_u$ of the fundamental wave component is corrected, to thereby modify the effective value into $(E_u - E_{u6} \cdot \cos 6\omega_L t)$.

As represented by the expression (2), when only the fifth-order harmonic components of the load currents iu, iv, iw are considered, the power $P_u$ is represented by the expression (10).

$$P_u = E_u I_u (1 + \cos 2\omega_L t) - E_{u6} I_u (2 \cos 6\omega_L t + \cos 4\omega_L t + \cos 8\omega_L t)/2 + E_u I_{u5} (\cos 6\omega_L t + \cos 4\omega_L t) - E_{u6} I_{u5} (1 + \cos 2\omega_L t + \cos 10\omega_L t + \cos 12\omega_L t)/2 \quad (10)$$

The effective value $E_u$ of the fundamental wave component is determined when the voltage command Vu* is set in the voltage command generation section 601. Since the load current iu can be monitored by the current sensor, the values $I_u$, $I_{u5}$ can be known. Thus, in the voltage command generation section 601, the coefficient $E_{u6}$ of the correction value is set so as to satisfy the expression (11).

$$E_{u6} I_u = E_u I_{u5} \quad (11)$$

Accordingly, the ripple term of the expression (10) is $E_{u6} I_{u5} \cdot (1/2) \cdot (1 + \cos 12\omega_L t)$. Since in the steady state, any of the effective values $I_{u5}$, $I_{v5}$, $I_{w5}$ takes the value $I_{L5}$, any of the coefficients $E_{u6}$, $E_{v6}$, $E_{w6}$ takes the value $E_{L6}$. Therefore, the power $P_L$ representing the sum of power consumptions is represented by the expression (12).

$$P_L = 3E_L I_L - 3E_{L6} I_{L5} \cos^2 6\omega_L t \quad (12)$$

In the expression (12), the coefficients $E_{L6}$, $I_{L5}$ in the ripple term of the power $P_L$ represent the magnitude of the sixth-order harmonic component and the fifth-order harmonic component, respectively. These are smaller than the effective values $E_L$, $I_L$ of the fundamental wave components. Therefore, the ripple term of the expression (12) is reduced, as compared with the ripple term of the expression (4) which indicates a case where no compensation is performed on the voltage. For example, in a case where a motor employing the concentrated winding is adopted as the load 2, the value of $I_{L5}/I_L$ is approximately 5%. At this time, from the expression (12), the value of $E_{L6}/E_L$ is also approximately 5%, and thus the ripple term is 3×0.05×0.05=0.075%, whose influence is negligible.

In a case where the AC voltages Vu, Vv, Vw are applied to the inductive load 2 in this manner, a ripple of active power caused by odd-number-order harmonic components of the load current is reduced.

Moreover, by performing the compensation indicated by the expression (9), the ripple term is reduced even though not only the fifth-order harmonic component but also the seventh-order harmonic component is included in the load current. Advantages thereof will be described below.

When the load currents iu, iv, iw include both of the fifth-order harmonic component and the seventh-order harmonic component, the load currents iu, iv, iw are represented by the expression (13).

$$iu = \sqrt{2} I_u \cos \omega_L t + \sqrt{2} I_{u5} \cos 5\omega_L t + \sqrt{2} I_{u7} \cos 7\omega_L t$$
$$iv = \sqrt{2} I_v \cos(\omega_L t - 2\pi/3) + \sqrt{2} I_{v5} \cos 5(\omega_L t - 2\pi/3) + \sqrt{2} I_{v7} \cos 7(\omega_L t - 2\pi/3)$$
$$iw = \sqrt{2} I_w \cos(\omega_L t + 2\pi/3) + \sqrt{2} I_{w5} \cos 5(\omega_L t + 2\pi/3) + \sqrt{2} I_{w7} \cos 7(\omega_L t + 2\pi/3) \quad (13)$$

Therefore, using the voltage Vu indicated by the expression (9), the power $P_u$ is represented by the expression (14).

$$P_u = E_u I_u (1 + \cos 2\omega_L t) - E_{u6} I_u (2 \cos 6\omega_L t + \cos 4\omega_L t + \cos 8\omega_L t)/2 + E_u I_{u5} (\cos 6\omega_L t + \cos 4\omega_L t) - E_{u6} I_{u5} (1 + \cos 2\omega_L t + \cos 10\omega_L t + \cos 12\omega_L t)/2 + E_u I_{u7} (\cos 6\omega_L t + \cos 8\omega_L t) - E_{u6} I_{u7} (1 + \cos 2\omega_L t + \cos 12\omega_L t + \cos 14\omega_L t)/2 \quad (14)$$

Since the load current iu can be monitored by the current sensor, the values $I_u$, $I_{u5}$, $I_{u7}$ can be known. Thus, in the voltage command generation section 601, the coefficient $E_{u6}$ of the correction value is set so as to satisfy the expression (15).

$$E_{u6} I_u = E_u (I_{u5} + I_{u7}) \quad (15)$$

Accordingly, the ripple term of the expression (14) is $E_{u6} (I_{u5} - I_{u7}) \cdot (1/2) \cdot (1 + \cos 12\omega_L t)$. Since in the steady state, any of the effective values $I_{u5}$, $I_{v5}$, $I_{w5}$ takes the value $I_{L5}$ and any of the effective values $I_{u7}$, $I_{v7}$, $I_{w7}$ takes the value $I_{L7}$, any of the coefficients $E_{u6}$, $E_{v6}$, $E_{w6}$ takes the value $E_{L6}$. Therefore, the power $P_L$ representing the sum of power consumptions is represented by the expression (16).

$$P_L=3E_L I_L-3E_{L6}(I_{u5}+I_{u7})\cos^2 6\omega_L t \quad (16)$$

In the expression (16), the coefficients $E_{L6}$, $(I_{L5}+I_{L7})$ in the ripple term of the power $P_L$ represent the magnitude of the sixth-order harmonic component and the magnitude of the sum of the fifth-order harmonic component and the seventh-order harmonic component, respectively. These are smaller than the effective values $E_L$, $I_L$ of the fundamental wave components. Therefore, the ripple term of the expression (16) is reduced, similarly to the expression (12).

From the above, by adopting the expression (9) to set the voltage command, the power ripple term is reduced not only in a case where the load current has the fifth-order component harmonic but also in a case where the load current has the seventh-order component harmonic.

As apparent from the form of the expression (9), the voltage Vu takes a value obtained by an effective value ($E_u - E_{u6} \cdot \cos 6\omega_L t$) being modulated by the $\cos \omega_L t$. Therefore, by adopting $(Ks1 - Ks6 \cdot \cos 6\phi)$ as the voltage control rate Ks of the voltage command generation section 601, the voltage command Vu* corresponding to the aforesaid voltage Vu can be obtained. Here, a relationship of $Ks6/Ks1 = E_{u6}/E_u$ is established.

According to the expression (9), a ratio (Ks6/Ks1) of the absolute value of an AC component with respect to a DC component of the voltage control rate is equal to a ratio $(I_{L5}/I_L)$ of the absolute value of the fifth-order harmonic component of the load current with respect to the absolute value of the fundamental wave component of the load current. According to the expression (12), a ratio (Ks6/Ks1) of the absolute value of the AC component with respect to a DC component of the voltage control rate is equal to a ratio $((I_{L5}+I_{L7})/I_L)$ of the sum of the absolute value of the fifth-order harmonic component and the absolute value of the seventh-order harmonic component of the load current with respect to the absolute value of the fundamental wave component of the load current. Here, in order that the maximum value of the voltage control rate Ks can be equal to or less than 1, it is desirable that the value of Ks1+Ks6 is set equal to or less than 1.

That is, the voltage control rate Ks of the inverter 4 has the DC component Ks1 and the AC component ($-Ks6 \cdot \cos (6\omega_L t)$), and this AC component has a frequency ($6\phi/2\pi t$) of six times the fundamental frequency ($\phi/2\pi t$) of the AC voltages Vu, Vv, Vw outputted by the inverter 4.

For example, as the voltage commands Vu*, Vv*, Vw* of the inverter 4 in a case where the AC component is not included, a waveform (hereinafter referred to as a "pseudo-trapezoidal waveform") can be adopted which repeatedly exhibits $\sqrt{3}\cdot Ks \cdot \sin(\theta-\pi/6) \to Ks \cdot \sin(\theta) \to Ks \cdot \sin(\theta-\pi/3) \to \sqrt{3}Ks \cdot \sin(\theta-\pi/6) \to Ks \cdot \sin(\theta) \to Ks \cdot \sin(\theta-\pi/3) \to$ . . . each time the phase increases by 60 degrees, as illustrated in Japanese Patent Application Laid-Open No. 2007-312589 and Japanese Patent Publication No. 6-81514 (1994) (here, the phase angles θ are shifted from one another by $2\pi/3$). As described in Japanese Patent Publication No. 6-81514 (1994), adoption of such a pseudo-trapezoidal waveform can increase the maximum value of the fundamental wave component of a voltage that is outputtable without causing the amplitude of the voltage commands Vu*, Vv*, Vw* to exceed the amplitude of the carrier C.

As a result, a vector adopted in the inverter 4 repeatedly transits in any of the following manners: (i) V0→V4→V6→V7→V6→V4→ . . . , (ii) V0→V2→V6→V7→V6→V2→ . . . , (iii) V0→V2→V3→V7→V3→V2→ . . . , (iv) V0→V1→V3→V7→V3→V1→ . . . , (v) V0→V1→V5→V7→V5→V1→ . . . , and (vi) V0→V4→V5→V7→V5→V4→ . . . .

As described above, the phase angles of the voltage commands Vu*, Vv*, Vw* (that is, the phases) having the pseudo-trapezoidal waveforms are shifted from one another by 120 degrees, which is an integer multiple of 60 degrees. Therefore, as the voltage commands Vu*, Vv*, Vw*, a waveform represented by an expression which varies each time the phase increases by 60 degrees is exhibited. In other words, it suffices that the voltage control rate Ks is updated in each 60-degrees section of the phase φ of the voltages Vu, Vv, Vw outputted by the inverter 4 (that is, each time the six transit patterns are updated). Moreover, the harmonic components corresponding to three phases are collectively compensated. Normally, the phase angle φ is controlled so as to coincide with the command value φ* of the phase. Therefore, the voltage command generation section 601 can update the voltage control rate Ks based on the command value φ*.

Furthermore, the AC component of the voltage control rate Ks varies at a frequency of 6 (=3×2) times the frequency of the AC voltages Vu, Vv, Vw. Therefore, even in the pseudo-trapezoidal waveform having three phases shifted from one another by 120 degrees (=$2\pi/3$), the same value can be adopted as the AC component of the voltage control rate Ks without a phase shift (because $\cos 6(\phi \pm 2\pi/3) = \cos 6\phi$ is established).

Needless to say, the voltage commands Vu*, Vv*, Vw* are generated based on the respective command values v*, φ*, f* of the amplitude, the phase, and the frequency of the AC voltages Vu, Vv, Vw. The voltage commands Vu*, Vv*, Vw* are generated by a known method except that the voltage control rate Ks includes the AC component.

Figure 4:
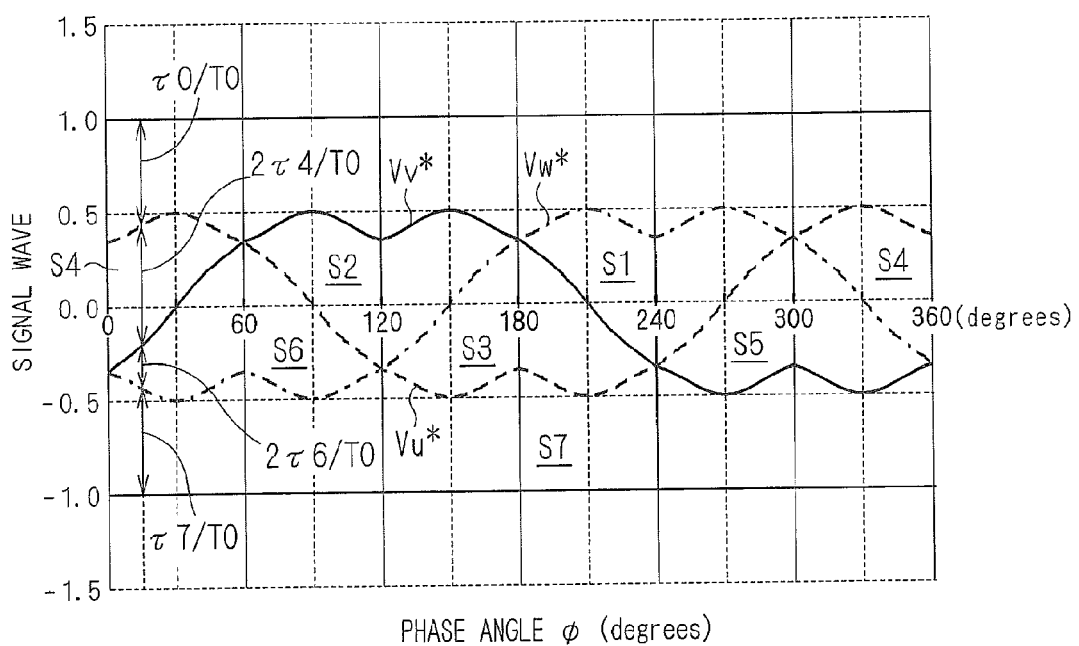
FIG. 4 is a graph showing voltage commands.

FIG. 4 is a graph showing the voltage commands Vu*, Vv*, Vw* in a case where Ks1=0.45 and Ks=0.65 are established. In a section where the phase φ is 0 to 60 degrees, Vu*=Ks·sin(φ±π/3), Vv*=$\sqrt{3}$·Ks·sin(φ−π/6), and Vw*=−Ks·sin(φ+π/3) are adopted.

In FIG. 4, a ratio of each of the time periods τ0, τ4, τ6, τ7 in the phase angles corresponding to the graph shown in FIG. 3 with respect to the cycle T0 of the carrier C is shown. Referring also to FIG. 3, the carrier C is a triangular wave transiting in a range of −1 to 1, and there is a linear relationship between the elapse of time and a variation in the voltage. Therefore, a difference between the values of the signal waves or a difference between the maximum value 1 and the minimum value −1 of the carrier C is proportional to a time period where the vector occurs.

Here, a pattern of the transit of the vector is the above-mentioned pattern (i). Thus, the vectors V4, V6 appear twice in one cycle of the carrier C. In FIG. 4, time periods in which these vectors occur are indicated by 2τ4/T0, 2τ6/T0, respectively.

In a case where the carrier C takes a value from the value of the maximum phase of the signal wave to the maximum value 1 of the carrier C itself, the vector V0 is adopted. In a case where the carrier C takes a value from the value of the minimum phase of the signal wave to the minimum value −1 of the carrier C itself, the vector V7 is adopted. In a case where the carrier C takes a value between the value of the maximum phase and the value of the intermediate phase of the signal waves, or a value between the value of the minimum phase and the value of the intermediate phase of the signal waves, different vectors are adopted in accordance with the patterns (i) to (vi) of the transit of the vectors. In FIG. 4, these adopted vectors are additionally indicated as the reference sign Sx (subscript x is equal to the subscript of the vector Vx).

Figure 5:
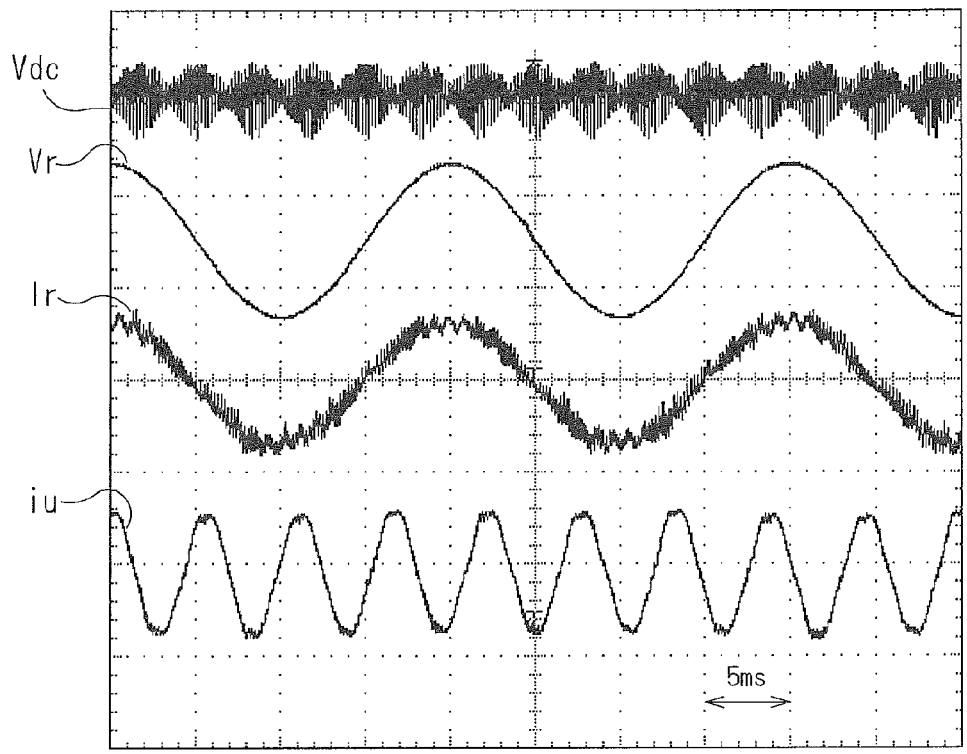
FIG. 5 is a graph showing voltages and currents.
Figure 6:
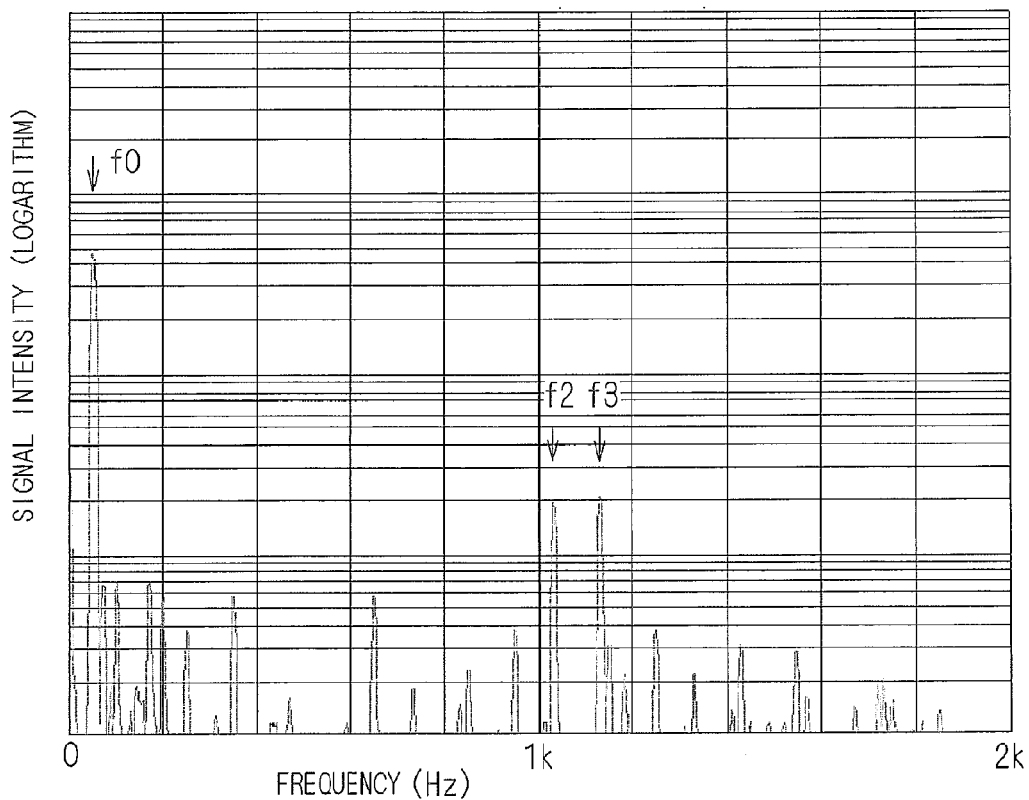
FIG. 6 is a spectrum of a line current.

Each of FIG. 5 and FIG. 7 is a graph showing a rectified voltage Vdc, an R-phase voltage Vr, an R-phase line current Ir, and a U-phase load current iu. Each of FIG. 6 and FIG. 8 shows a spectrum of the line current Ir. FIG. 5 and FIG. 6 show a case where the voltage control rate Ks has only the DC component Ks1. FIG. 7 and FIG. 8 show a case where the voltage control rate Ks has not only the DC component Ks1 but also the AC component (−Ks6·cos 6φ).

In the spectrum, a frequency f0 which peaks at the low-order side represents a frequency of the input-side voltage Vr. Here, f0=50 (Hz) is adopted. In the spectrum, frequencies f2, f3 which peak in a range of 1 to 1.2 kHz are equal to the frequencies 6·f1−f0, 6·f1+f0, respectively, where the frequency f1 of the output-side voltage Vu is introduced. The reason therefore will be described later. Here, f1=180 (Hz) is established, and thus f2=1030 (Hz) and f3=1130 Hz are established.

As described by using the expressions (4) and (8), according to the findings of the inventor, in either case where the ripple terra of the power $P_L$ results from the fifth-order harmonic component or the seventh-order harmonic component of the load current, the ripple occurs at a frequency of six times the output frequency $\omega_L/2\pi$. Even when the rectified voltage Vdc is controlled so as to be constant, a current flowing in a DC link varies at cos $6\omega_L$t. Here, when a current-source converter is used as the converter 3, in consideration of a current conduction ratio of each phase, the current flowing in the DC link is modulated by a sine wave, to thereby make an input current a sine wave (for example, see Lixiang Wei, Thomas. A Lipo, "A Novel Matrix Converter Topology With Simple Commutation", IEEE IAS 2001, vol. 3, 2001, pp 1749-1754 and Japanese Patent Application Laid-Open No. 2007-312589). More specifically, an angular frequency $\omega_S$ of the voltages Vr, Vs, Vt is introduced, and the modulation is made by using cos $\omega_S$t. Accordingly, the input current Ir ripples at cos $\omega_S$t·cos $6\omega_L$t. This ripple component is expressed as cos $\omega_S$t·cos $6\omega_L$t=(½)(cos($6\omega_L$t−$\omega_S$t)+cos($6\omega_L$t+$\omega_S$t)). Thus, as described above, a peak occurs in the spectrum at a frequency of 6·f1−f0, 6·f1+f0.

Even when there is a ripple of the rectified voltage Vdc, the spectrum peak caused by the fifth-order harmonic component and/or the seventh-order harmonic component of the load current is reduced in a case shown in FIG. 8, as compared with a case shown in FIG. 6. Therefore, it is visually observed that power-source harmonics are suppressed by reducing the ripple term of the power $P_L$.

Needless to say, this embodiment is not limited to a case where a current which flows in the DC link when a current-source converter is used as the converter 3 is modulated by a sine wave. This is because, as indicated by the expressions (1) and (2), this embodiment considers a power ripple based on harmonics of a load current, and proposes a desirable control method based on the load-side voltages Vu, Vv, Vw and currents iu, iv, iw. In other words, it can be said that an influence of the commutation of the converter 3 is included in the voltages Vu, Vv, Vw and the currents iu, iv, iw.

Moreover, it is not limited to a case where the voltage commands Vu*, Vv*, Vw* have pseudo-trapezoidal waveforms. As long as the voltage control rate Ks has the DC component Ks1 and the AC component (Ks6·cos($6\omega_L$t)), the effects already described by using the mathematical expressions can be also obtained with other waveforms.

A main circuit system to which this embodiment is applicable is not limited to a case where the DC link is provided as illustrated in FIG. 1. That is, this embodiment may be applied also to a direct-type AC power converter of a virtual DC link system introduced in Japanese Patent Application Laid-Open No. 2004-222338 and Rie Itoh and Isao Takahashi, "Decoupling Control of Input and Output Reactive Power of the Matrix Converter", IEEJ Technical Meeting on Semiconductor Power Converter, SPC-01-121, IEA-01-64.

Figure 10:
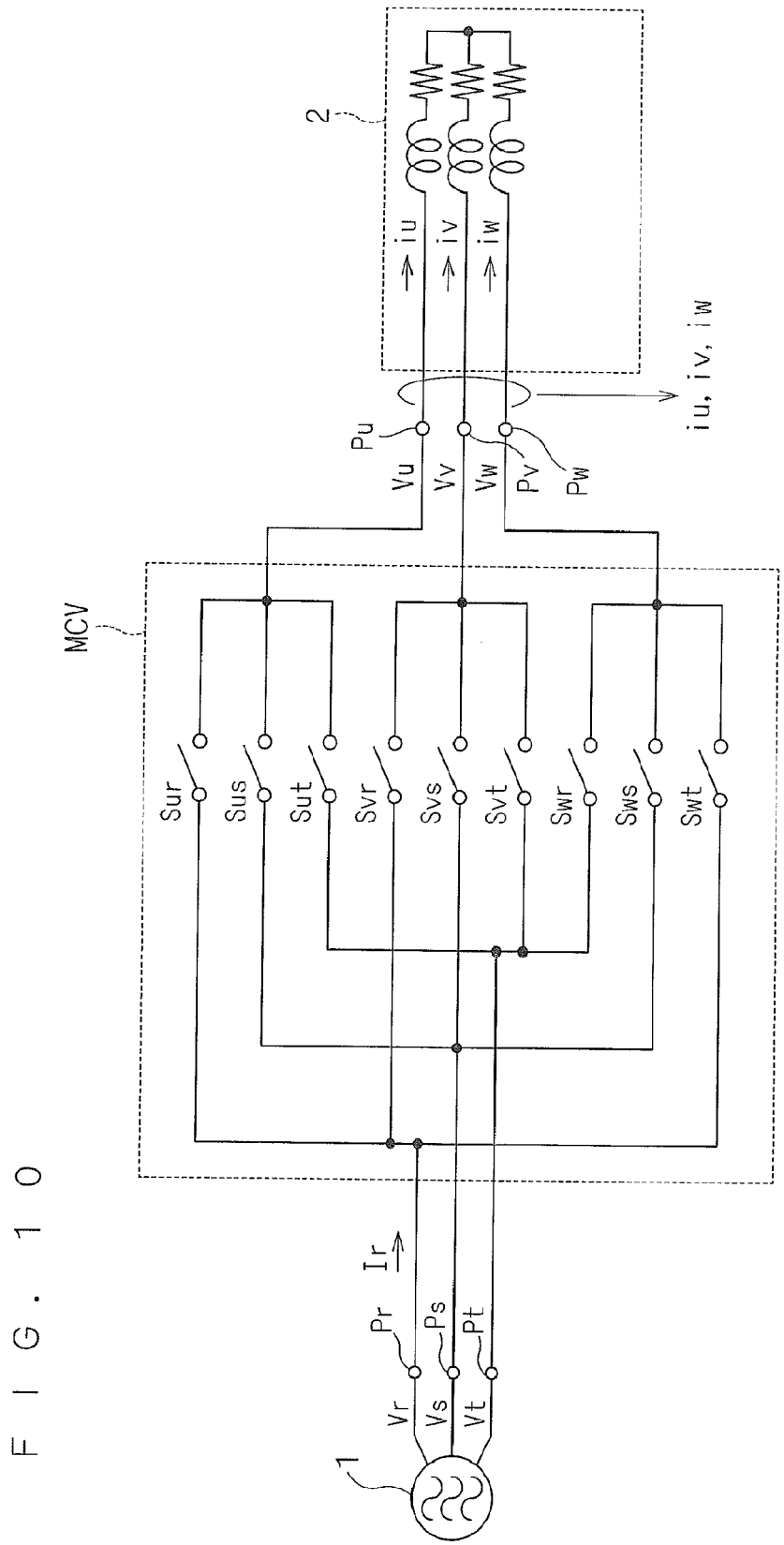
FIG. 10 is a circuit diagram showing a configuration of a direct matrix converter to which the present invention is applicable.

FIG. 10 is a circuit diagram showing a configuration of another direct-type power converter to which this embodiment is applicable. Here, a direct matrix converter MCV is shown as an example of the direct-type power converter.

The direct matrix converter MCV has input ends Pr, Ps, Pt and output ends Pu, Pv, Pw. The AC voltages Vr, Vs, Vt are inputted to the input ends Pr, Ps, Pt, respectively. The three-phase AC output voltages Vu, Vv, Vw are outputted from the output ends Pu, Pv, Pw, respectively.

The direct matrix converter MCV has switching elements Sur, Sus, Sut, Svr, Svs, Svt, Swr, Sws, Swt. The three switching elements Sur, Sus, Sut are connected between the output end Pu and the input ends Pr, Ps, Pt, respectively. The three switching elements Svr, Svs, Svt are connected between the output end Pv and the input ends Pr, Ps, Pt, respectively. The three switching elements Swr, Sws, Swt are connected between the output end Pw and the input ends Pr, Ps, Pt, respectively.

In a case where the control method according to this embodiment is applied to the direct matrix converter MCV, a virtual AC/DC/AC control is adopted. In this virtual AC/DC/AC control, for example, the converter 3 and the inverter 4 shown in FIG. 1 are virtually provided. A pair of DC power supply lines L1, L2 can be assumed as a virtual DC link connecting the converter 3 and the inverter 4 to each other. Thus, in the virtual AC/DC/AC control adopted for the direct matrix converter MCV, the converter 3 is assumed as a virtual rectifier circuit for virtually rectifying the AC voltages Vr, Vs, Vt to obtain a virtual rectified voltage Vdc, and the inverter 4 is assumed as a virtual voltage-source inverter for obtaining the AC voltages Vu, Vv, Vw from the virtual rectified voltage Vdc. In the same manner as described above, the gate signals Sup*, Svp*, Swp*, Sun*, Svn*, Swn* are generated in order that the DC component Ks1 and the AC component Ks6·cos($6\omega_L$t) having the frequency $6\phi/2\pi$t which is six times the fundamental frequency $\phi/2\pi$t of the AC voltages Vu, Vv, Vw can be included in the voltage control rate Ks of the virtual voltage-source inverter. A method for generating these gate signals is as described above, and an operation of the inverter 4 serving as the virtual voltage inverter is controlled.

As for the switching of the converter 3 serving as the virtual rectifier circuit, in the same manner as the switching of the actual converter 3, the gate signals Srp*, Ssp*, Stp*, Srn*, Ssn*, Stn* for controlling conducting/non-conducting of the switching elements Srp, Ssp, Stp, Srn, Ssn, Stn are obtained with reference to Lixiang Wei, Thomas. A Lipo, "A Novel Matrix Converter Topology With Simple Commutation", IEEE IAS 2001, vol. 3, 2001, pp 1749-1754 and Japanese Patent Application Laid-Open No. 2007-312589, for example.

Figure 11:
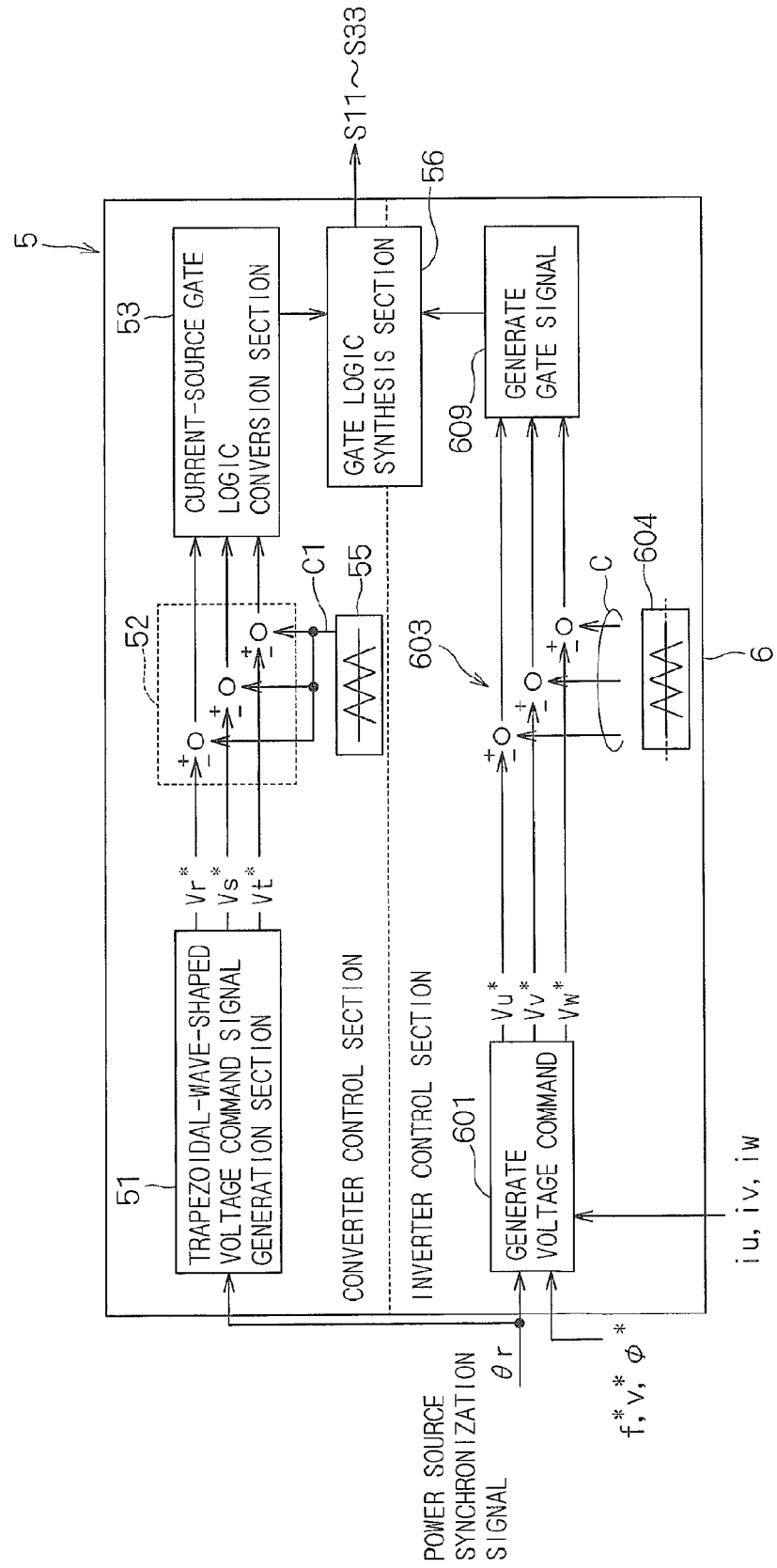
FIG. 11 is a block diagram showing a circuit which generates a signal for controlling a direct matrix converter.

FIG. 11 is a block diagram showing a circuit which generates a signal for controlling a direct matrix converter. This circuit is configured such that a converter control section 5 is additionally provided to the inverter control section 6 shown in FIG. 2. The converter control section 5 includes a trapezoidal-wave-shaped voltage command signal generation section 51, a comparison section 52, a carrier generation section 55, and a current-source gate logic conversion section 53.

The trapezoidal-wave-shaped voltage command signal generation section 51 generates trapezoidal-wave-shaped voltage command signals Vr*, Vs*, Vt* based on the power source synchronization signal θr. The carrier generation section 55 generates a carrier C1. In the comparison section 52, the trapezoidal-wave-shaped voltage command signals Vr*, Vs*, Vt* and the carrier C1 are compared with each other. A result of this comparison is converted by the current-source gate logic conversion section 53, and the gate signals Srp*, Ssp*, Stp*, Srn*, Ssn*, Stn* are obtained.

The conversion performed by the current-source gate logic conversion section 53 is necessary, because the converter 3 is a current-source type and thus a command signal given to the comparison section 52 is a voltage command signal. Details thereof are not directly related to the control method of this embodiment, and are well-known techniques according to Lixiang Wei, Thomas. A Lipo, "A Novel Matrix Converter Topology With Simple Commutation", IEEE IAS 2001, vol. 3, 2001, pp 1749-1754, Japanese Patent Application Laid-Open No. 2007-312589, and the like. Therefore, the details are omitted here.

A gate logic synthesis section 56 performs matrix transformation on the gate signals Srp*, Ssp*, Stp*, Srn*, Ssn*, Stn*, Sup*, Svp*, Swp*, Sun*, Svn*, Swn* based on the following expression, and outputs them as switching signals of the direct-type conversion section MCV.

$$\begin{bmatrix} S13 & S23 & S33 \\ S12 & S22 & S32 \\ S11 & S21 & S31 \end{bmatrix} = \begin{bmatrix} Sup^* & Sun^* \\ Svp^* & Svn^* \\ Swp^* & Swn^* \end{bmatrix} \begin{bmatrix} Srp^* & Ssp^* & Stp^* \\ Srn^* & Ssn^* & Stn^* \end{bmatrix} \quad (17)$$

Switching signals S11, S12, S13, S21, S22, S23, S31, S32, S33 are switching signals for the switching elements Sur, Sus, Sut, Svr, Svs, Svt, Swr, Sws, Swt, respectively. The reasonableness of this matrix transformation is already well known from Japanese Patent Application Laid-Open No. 2004-222338 and Rie Itoh and Isao Takahashi, "Decoupling Control of Input and Output Reactive Power of the Matrix Converter", IEEJ Technical Meeting on Semiconductor Power Converter, SPC-01-121, IEA-01-64.

As introduced in Japanese Patent No. 4067021, an application to a conversion circuit using a quite small capacitor may be acceptable. Alternatively, the input-side of the converter 3 which is outputted to the DC link may be either a single-phase input or a multi-phase input.

While the invention has been described in detail, the foregoing description is in all aspects illustrative and not restrictive. It is therefore understood that numerous modifications and variations can be devised without departing from the scope of the invention.

DESCRIPTION OF THE REFERENCE NUMERALS 2 load
3 converter
4 inverter
9 direct-type AC power converter
Vr, Vs, Vt, Vu, Vv, Vw AC voltage
C carrier
Vu*, Vv*, Vw* voltage command

The invention claimed is:

1. A power converter control method for controlling a direct-type AC power converter,
said direct-type AC power converter comprising:
a rectifier circuit having a first AC voltage inputted thereto and outputting a rectified voltage; and
a voltage-source inverter having said rectified voltage inputted thereto and outputting a second AC voltage,
wherein a voltage control rate of said voltage-source inverter has a DC component and an AC component whose frequency is six times a fundamental frequency of said second AC voltage.

2. The power converter control method according to claim 1, wherein
a ratio of the absolute value of said AC component of said voltage control rate with respect to said DC component of said voltage control rate is equal to a ratio of the absolute value of a fifth-order harmonic component of a current flowing in the output side of said voltage-source inverter with respect to the absolute value of a fundamental wave component of said current.

3. A power converter controlled by the power converter control method according to claim 2,
said power converter comprising said rectifier circuit and said voltage-source inverter.

4. The power converter control method according to claim 1, wherein
a ratio of the absolute value of said AC component of said voltage control rate with respect to said DC component of said voltage control rate is equal to a ratio of the sum of the absolute value of a fifth-order harmonic component and the absolute value of a seventh-order harmonic component of a current flowing in the output side of said voltage-source inverter with respect to the absolute value of a fundamental wave component of said current.

5. A power converter controlled by the power converter control method according to claim 4,
said power converter comprising said rectifier circuit and said voltage-source inverter.

6. The power converter control method according to claim 1, wherein
said second AC voltage has three phases,
said voltage control rate is updated in each 60-degree section of a phase of said second AC voltage.

7. A power converter controlled by the power converter control method according to claim 6,
said power converter comprising said rectifier circuit and said voltage-source inverter.

8. The power converter control method according to claim 1, wherein
said voltage-source inverter is controlled by a pulse-width modulation based on a result of comparison between a carrier and a signal wave,
said signal wave is determined in accordance with a space vector modulation based on said voltage control rate and a command value of each of the amplitude, the phase, and the frequency of said second AC voltage.

9. A power converter controlled by the power converter control method according to claim 8,
said power converter comprising said rectifier circuit and said voltage-source inverter.

10. A power converter controlled by the power converter control method according to claim 1,
said power converter comprising said rectifier circuit and said voltage-source inverter.

11. A power converter control method for controlling a direct matrix converter which is a direct-type AC power converter and which has a first AC voltage inputted thereto and outputs a second AC voltage, wherein
in a virtual AC/DC/AC control in which a virtual rectifier circuit for virtually rectifying said first AC voltage to obtain a virtual rectified voltage and a virtual voltage-source inverter for obtaining said second AC voltage from said virtual rectified voltage are assumed, a voltage control rate of said virtual voltage-source inverter has a DC component and an AC component whose frequency is six times a fundamental frequency of said second AC voltage.

12. The power converter control method according to claim 11, wherein a ratio of the absolute value of said AC component of said voltage control rate with respect to said DC component of said voltage control rate is equal to a ratio of the absolute value of a fifth-order harmonic component of a current flowing in the output side of said virtual voltage-source inverter with respect to the absolute value of a fundamental wave component of said current.

13. A direct matrix converter controlled by the power converter control method according to claim 12.

14. The power converter control method according to claim 11, wherein a ratio of the absolute value of said AC component of said voltage control rate with respect to said DC component of said voltage control rate is equal to a ratio of the sum of the absolute value of a fifth-order harmonic component and the absolute value of a seventh-order harmonic component of a current flowing in the output side of said virtual voltage-source inverter with respect to the absolute value of a fundamental wave component of said current.

15. A direct matrix converter controlled by the power converter control method according to claim 14.

16. The power converter control method according to claim 11, wherein said second AC voltage has three phases, said voltage control rate is updated in each 60-degree section of a phase of said second AC voltage.

17. A direct matrix converter controlled by the power converter control method according to claim 16.

18. The power converter control method according to claim 11, wherein said virtual voltage-source inverter is controlled by a pulse-width modulation based on a result of comparison between a carrier and a signal wave, said signal wave is determined in accordance with a space vector modulation based on said voltage control rate and a command value of each of the amplitude, the phase, and the frequency of said second AC voltage.

19. A direct matrix converter controlled by the power converter control method according to claim 18.

20. A direct matrix converter controlled by the power converter control method according to claim 11.

* * * * *